(12) United States Patent
Downing et al.

(10) Patent No.: US 12,474,454 B2
(45) Date of Patent: Nov. 18, 2025

(54) SENSOR WITH CROSS TALK SUPPRESSION

(71) Applicant: STMICROELECTRONICS (RESEARCH & DEVELOPMENT) LIMITED, Marlow (GB)

(72) Inventors: James Peter Drummond Downing, Doune (GB); Adam Caley, Fife (GB); Christoph Kuch, Edinburgh (GB)

(73) Assignee: STMICROELECTRONICS (RESEARCH & DEVELOPMENT) LIMITED, Marlow (GB)

(*) Notice: Subject to any disclaimer, the term of this patent is extended or adjusted under 35 U.S.C. 154(b) by 1319 days.

(21) Appl. No.: 16/950,841

(22) Filed: Nov. 17, 2020

(65) Prior Publication Data

US 2021/0165085 A1    Jun. 3, 2021

Related U.S. Application Data

(60) Provisional application No. 62/941,955, filed on Nov. 29, 2019.

(51) Int. Cl.
| | |
|---|---|
| *G01S 7/497* | (2006.01) |
| *G01S 7/499* | (2006.01) |
| *G01S 17/08* | (2006.01) |
| *H01S 5/183* | (2006.01) |

(52) U.S. Cl.
CPC .............. *G01S 7/497* (2013.01); *G01S 7/499* (2013.01); *G01S 17/08* (2013.01); *H01S 5/18386* (2013.01)

(58) Field of Classification Search
CPC ...................................................... G01S 7/499
See application file for complete search history.

(56) References Cited

U.S. PATENT DOCUMENTS

| | | | | |
|---|---|---|---|---|
| 5,631,494 | A | * | 5/1997 | Sakurai ............... H01L 27/0251 |
| | | | | 257/E29.198 |
| 6,545,821 | B2 | | 4/2003 | Katsuma |
| 7,656,585 | B1 | | 2/2010 | Powell et al. |
| 2004/0033637 | A1 | * | 2/2004 | Johnson ................... H01S 5/183 |
| | | | | 438/483 |
| 2007/0242715 | A1 | * | 10/2007 | Gustavsson ......... H01S 5/18355 |
| | | | | 372/45.01 |
| 2012/0132793 | A1 | | 5/2012 | Campbell et al. |
| 2012/0133956 | A1 | * | 5/2012 | Findlay ................. H01L 31/173 |
| | | | | 257/E31.127 |
| 2012/0249740 | A1 | | 10/2012 | Lee et al. |
| 2017/0176184 | A1 | | 6/2017 | Lee et al. |
| 2018/0246209 | A1 | | 8/2018 | Townsend |
| 2020/0116836 | A1 | * | 4/2020 | Pacala ..................... G01S 17/86 |

OTHER PUBLICATIONS

Bing Shen, Peng Wang, Randy Polson, and Rajesh Menon, "Ultra-high-efficiency metamaterial polarizer," Optica 1, 356-360 (2014) (Year: 2014).*
Li, et al., *Vertical-Cavity Surface-Emitting Laser Devices*, Springer, 2003, 394 pages.
Shen et al., "Ultra-high-efficiency metamaterial polarizer," *Optica* 1(5):356-360, 2014.

* cited by examiner

*Primary Examiner* — Robert W Hodge
*Assistant Examiner* — Clara G Chilton
(74) *Attorney, Agent, or Firm* — Seed Intellectual Property Law Group LLP

(57) ABSTRACT

The present disclosure is directed to a sensor that detects a distance between the sensor and a target object. The sensor includes a transmission optical structure and/or a light source that polarizes light and minimizes cross talk within the sensor. As a result, detection results of the sensor are improved.

20 Claims, 10 Drawing Sheets

SENSOR WITH CROSS TALK SUPPRESSION

BACKGROUND

Technical Field

The present disclosure is directed to a sensor that reduces cross talk within the sensor.

Description of the Related Art

Proximity sensors, sometimes referred to as ranging sensors, are often used to detect a distance to a target object. Generally, proximity sensors include a transmitter that transmits a light signal at the target object, and a receiver that receives the light signal reflected from the target object back to the sensor. The distance from the sensor to the target object is then calculated based on the received light signal.

The light signal received by the receiver of the proximity sensor is often degraded or masked by light signals from unwanted paths in the proximity sensor and surrounding structures. For example, light signals reflected off of components within the proximity sensor itself and/or light signals transmitted directly from the transmitter of the proximity sensor may overpower and reduce the signal to noise ratio of the light signal received by the receiver. This phenomenon is sometimes referred to as cross talk.

Degradation of the light signal received by the receiver often cause inaccurate proximity calculation results. Thus, proximity sensors often include various solutions to minimize or reduce the amount of cross talk between the transmitter and the receiver of the proximity sensor. For example, some proximity sensors include physical structures to block light signals from external sources that may degrade or interfere with the light signal received by the receiver.

BRIEF SUMMARY

The present disclosure is directed to a sensor that detects a distance between the sensor and a target object. The sensor includes, in part, a transmission optical structure and a light source. The transmission optical structure includes a functional layer that provides one or more optical functions, such as a beam shaping function or a collimating function, and a polarizing layer that provides a polarizing function. The polarizing layer has a corralling property to convert or impose polarization of unpolarized light transmitted through the transmission optical structure to have mostly or all P-polarization. In addition, the light source emits a light signal that has mostly or all P-polarization. As the transmission optical structure and the light source both maximize P-polarization and minimize S-polarization of light within the sensor, cross talk within the sensor is reduced. As a result, detection results of the sensor are improved.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic devices, optical lenses, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Reference throughout the specification to integrated circuits is generally intended to include integrated circuit components built on semiconducting or glass substrates, whether or not the components are coupled together into a circuit or able to be interconnected. Throughout the specification, the term "layer" is used in its broadest sense to include a thin film, a cap, or the like, and one layer may be composed of multiple sub-layers.

It is noted that the dimensions set forth herein are provided as examples. Other dimensions are envisioned for this embodiment and all other embodiments of this application.

As discussed above, light signals received by a proximity sensor may be degraded due to cross talk. For example, light signals received by the proximity sensor may be degraded or masked by light signals from unwanted paths in the proximity sensor and surrounding structures, such as light signals reflected off of components within the proximity sensor itself and light signals transmitted directly from the transmitter of the proximity sensor. Consequently, proximity calculation results of proximity sensors may sometimes be inaccurate.

Figure 1A:
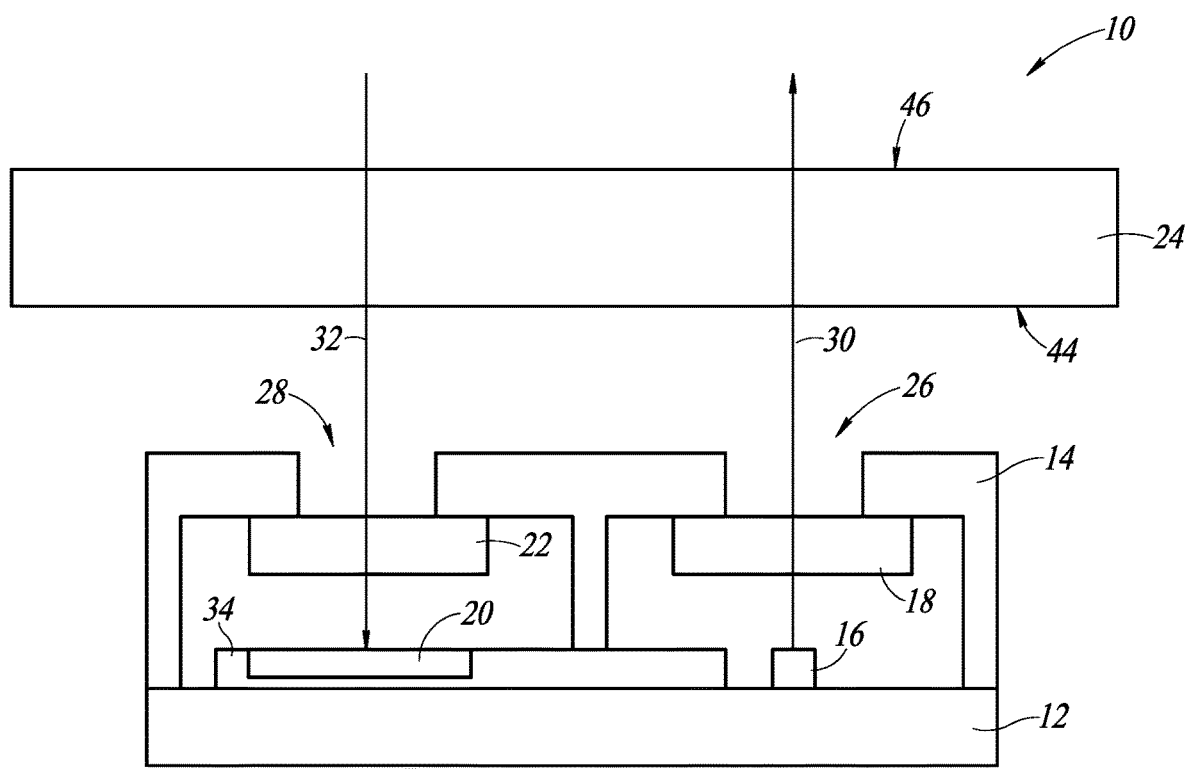
FIG. 1A is a diagram of a sensor according to an embodiment disclosed herein.

The present disclosure is directed to a sensor that reduces or removes cross talk within the sensor, and, thus, has improved detection results. FIG. 1A is a diagram of a sensor 10 according to an embodiment disclosed herein. The sensor 10 determines a distance between the sensor 10 and a target object external to the sensor 10. In one embodiment, the sensor 10 is a time-of-flight sensor. Operation of the sensor 10 will be discussed in further detail below.

The sensor 10 may be included in various electronic devices, such as mobile handsets, cameras, tablets, laptops, and computers, for a variety of different applications. For example, the sensor 10 may be incorporated into a mobile handset and used in conjunction with a camera to adjust a focus or a flash of the camera.

The sensor 10 includes a substrate 12, a body 14, a light source 16, a transmission optical structure 18, a detector 20, a reception optical structure 22, and a cover 24.

The substrate 12 provides a support platform for the sensor 10. The body 14, the light source 16, the transmission optical structure 18, the detector 20, and the reception optical structure 22 are positioned on the substrate 12. The substrate may be any type of rigid material, such as plastic, metal, glass, and semiconductor material. In one embodiment, the substrate 12 is a printed circuit board that includes one or more electrical components (e.g., capacitors, transistors, processors, etc.).

The body 14 is positioned on the substrate 12. The substrate 12 and the body 14, together, form an enclosure or package that contains the light source 16, the transmission optical structure 18, the detector 20, and the reception optical structure 22. The substrate 12 and the body 14 protect the light source 16, the transmission optical structure 18, the detector 20, and the reception optical structure 22 from an external environment. The body 14 includes an output aperture 26 and a detection aperture 28.

The output aperture 26 directly overlies and is aligned with the light source 16 and the transmission optical structure 18. The output aperture 26 provides a hole for a light signal 30 to pass through. The light signal 30 is a light signal or photons emitted from the light source 16 and directed to the target object in which a distance between the target object and the sensor 10 is being determined.

The detection aperture 28 directly overlies and is aligned with the detector 20 and the reception optical structure 22. The detection aperture 28 provides a hole for a light signal 32 to pass through. The light signal 32 is the light signal 30 reflected off of the target object.

The light source 16 is positioned on the substrate 12. The light source 16 directly underlies and is aligned with the transmission optical structure 18 and the output aperture 26.

The light source 16 emits the light signal 30 through the transmission optical structure 18 and the output aperture 26. In one embodiment, the light source 16 is an infrared or near infrared light source, such as a vertical-cavity surface-emitting laser (VCSEL). As will be discussed in further detail below, the light source 16 maximizes a first type of polarization (P-polarization) and minimizes a second type of polarization (S-polarization) of the light signal 30 to reduce or remove cross talk within the sensor 10.

The transmission optical structure 18 directly overlies the light source 16 and is aligned with the light source 16 and the output aperture 26. In one embodiment, the transmission optical structure 18 covers the entire output aperture 26. In one embodiment, the transmission optical structure 18 is physically coupled to the body 14.

The transmission optical structure 18 has one or more optical functions. In one embodiment, the transmission optical structure 18 has a beam shaping function, an imaging function, a collimating function, a diffusing function, a beam splitting function, a wavefront coding function, or a combination thereof. In addition, the transmission optical structure 18 maximizes the first type of polarization (P-polarization) and minimizes the second type of polarization (S-polarization) of the light signal 30 to reduce or remove cross talk within the sensor 10. The transmission optical structure 18 will be discussed in further detail below.

In one embodiment, the transmission optical structure 18 is made of one or more transparent materials. For example, in one embodiment, the transmission optical structure 18 is made of one or more of the following: silicon (Si), silicon dioxide, ($SiO_2$), zinc sulphide (ZnS), galium nitride (GaN), zinc selenide (ZnSe), titanium dioxide ($TiO_2$), silicon carbide (SiC), gallium phosphide (GaP), gallium arsenide (GaAs), and hydrogenated silicon (Si:H). Fabrication of the transmission optical structure 18 will be discussed in further detail below.

The detector 20 is positioned on the substrate 12. The detector 20 directly underlies and is aligned with the reception optical structure 22 and the detection aperture 28. In one embodiment, as shown in FIG. 1A, the detector 20 is integrated into a semiconductor substrate 34. The substrate 34 may include various electrical components (e.g., transistors, capacitors, resistors, processors, etc.) and devices (e.g., a reference sensor array).

The detector 20 receives the light signal 32, which is the light signal 30 reflected off of the target object and passes through the reception optical structure 22 and the detection aperture 28. The detector 20 includes a plurality of photodetectors that sense or measure the light signal 32. The detector 20 may be any type of sensors that measure light signals. In one embodiment, the detector 20 is a single-photon avalanche diode (SPAD) array.

The reception optical structure 22 directly overlies the detector 20 and is aligned with the detector 20 and the detection aperture 28. In one embodiment, the reception optical structure 22 covers the entire detection aperture 28. In one embodiment, the reception optical structure 22 is physically coupled to the body 14.

In one embodiment, the reception optical structure 22 has one or more optical functions. For example, in one embodiment, the reception optical structure 22 has a beam shaping function, an imaging function, a collimating function, a diffusing function, a polarizing function, a beam splitting function, a wavefront coding function, or a combination thereof.

In one embodiment, the reception optical structure 22 is made of a single transparent material (i.e., monolithic). In one embodiment, the reception optical structure 22 is made of one or more transparent materials. For example, the reception optical structure 22 may include one or more of the following: silicon (Si), silicon dioxide, (SiO2), zinc sulphide (ZnS), galium nitride (GaN), zinc selenide (ZnSe), titanium dioxide (TiO2), silicon carbide (SiC), gallium phosphide (GaP), gallium arsenide (GaAs), and hydrogenated silicon (Si:H).

The cover 24 directly overlies and is aligned with the sensor 10. The cover 24 protects the sensor 10 from a surrounding environment. In one embodiment, the cover 24 is a component of the electronic device in which the sensor 10 is included. For example, the cover 24 may be a protective layer of glass of a mobile handset.

In one embodiment, the cover 24 is made of one or more transparent materials. For example, the cover 24 may include one or more of the following: glass, plastic, silicon (Si), silicon dioxide, (SiO2), zinc sulphide (ZnS), galium nitride (GaN), zinc selenide (ZnSe), titanium dioxide (TiO2), silicon carbide (SiC), gallium phosphide (GaP), gallium arsenide (GaAs), and hydrogenated silicon (Si:H).

The sensor 10 determines a distance between the sensor 10 and the target object in a surrounding environment. The light source 16 transmits the light signal 30 through the transmission optical structure 18 and the output aperture 26, and at the target object. The detector 20 receives and measures the light signal 32, which is the light signal 30 that hits the target object and is reflected back through the reception optical structure 22 and the detection aperture 28. In one embodiment, the sensor 10 uses the light signal 30 and the light signal 32 to determine the time of flight of the light signal 30 to travel from the light source 16, to the target object, and back to the detector 20. A distance between the sensor 10 and the target object is determined based on the time of flight. In one embodiment, the sensor 10 uses an indirect time of flight method in which the light signal 30 is a modulated signal, and the sensor 10 determines a distance between the sensor 10 and the target object based on the relative phase of the light signal 30 and the light signal 32. In one embodiment, the distance between the sensor 10 and the target object is determined based on the relative intensities of the light signal 30 and the light signal 32. Other methods are also possible.

Figure 1B:
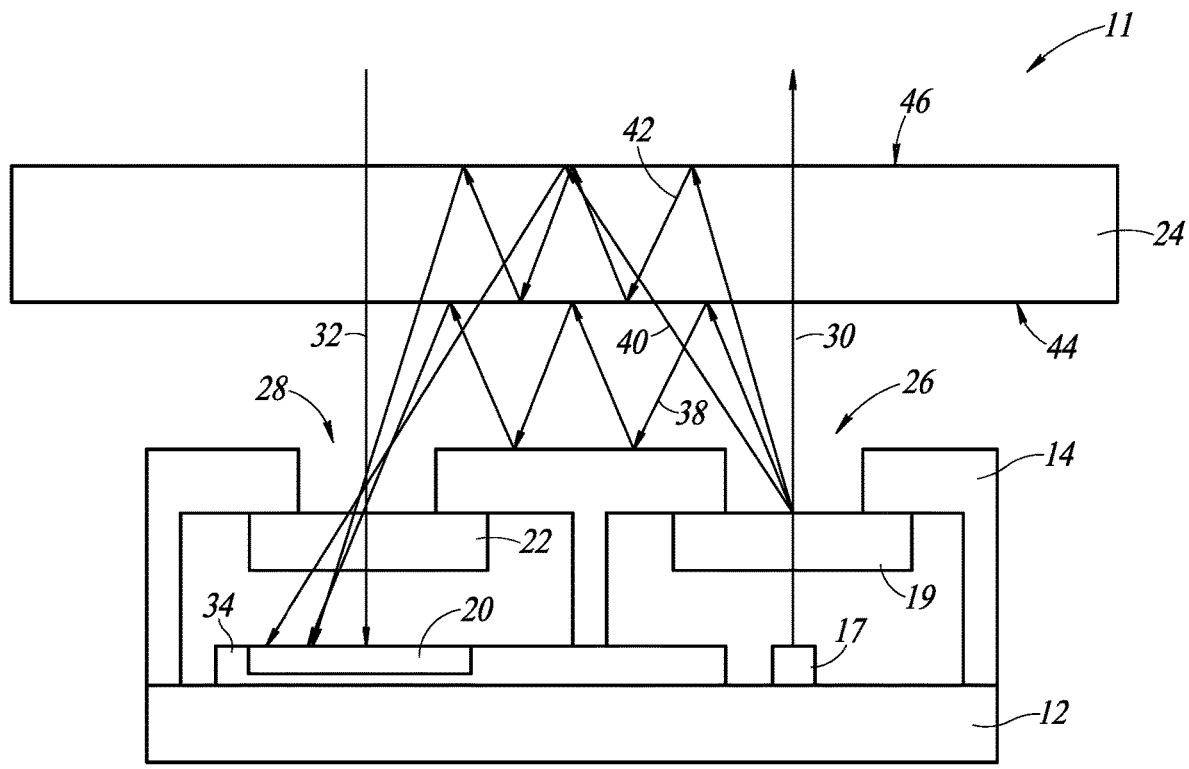
FIG. 1B is a diagram of a sensor without the light source and the transmission optical structure of the sensor of FIG. 1A.

As discussed above, the light source 16 and the transmission optical structure 18 maximize a first type of polarization (P-polarization) and minimize a second type of polarization (S-polarization) of the light signal 30 to reduce or remove cross talk within the sensor 10. If the sensor 10 did not include the light source 16 and the transmission optical structure 18, the light signal 32, which is the light signal 30 reflected off of the target object and received by the detector 20, may potentially become degraded or interfered with by light signals or photons from other sources, such as the light signal 30 reflected off of other surfaces of the sensor 10. Stated differently, the detector 20 may detect light signals or photons reflected off of, for example, the body 14 instead of the target object, and, thus, may give erroneous ranging errors. This phenomenon is sometimes referred to as cross talk. For example, FIG. 1B is a sensor 11 without the light source 16 and the transmission optical structure 18 of the sensor 10. The sensor 11 includes the same components as the sensor 10, except that the light source 16 is replaced with a light source 17 and the transmission optical structure 18 is replaced with a transmission optical structure lens 19.

In contrast to the light source 16 and the transmission optical structure 18, the light source 17 and the transmission optical structure 19 do not maximize a first type of polarization (P-polarization) and minimize a second type of polarization (S-polarization) of the light signal 30. Consequently, referring to FIG. 1B, one or more of a light signal 38, a light signal 40, and a light signal 42 may reduce the signal to noise ration of the light signal 32. The light signal 38 is a portion of the light signal 30 that is reflected off of the body 14 and a lower surface 44 of the cover 24, and to the detector 20. The light signal 40 is a portion of the light signal 30 that is reflected off of an upper surface 46 of the cover 24, and to the detector 20. The light signal 42 is a portion of the light signal 30 that is reflected off of the lower surface 44 and the upper surface 46 of the cover 24, and to the detector 20. Cross talk within the sensor 11 will often limit the accuracy of the sensor 11 when the light signal 32 is sufficiently small.

Figure 2:
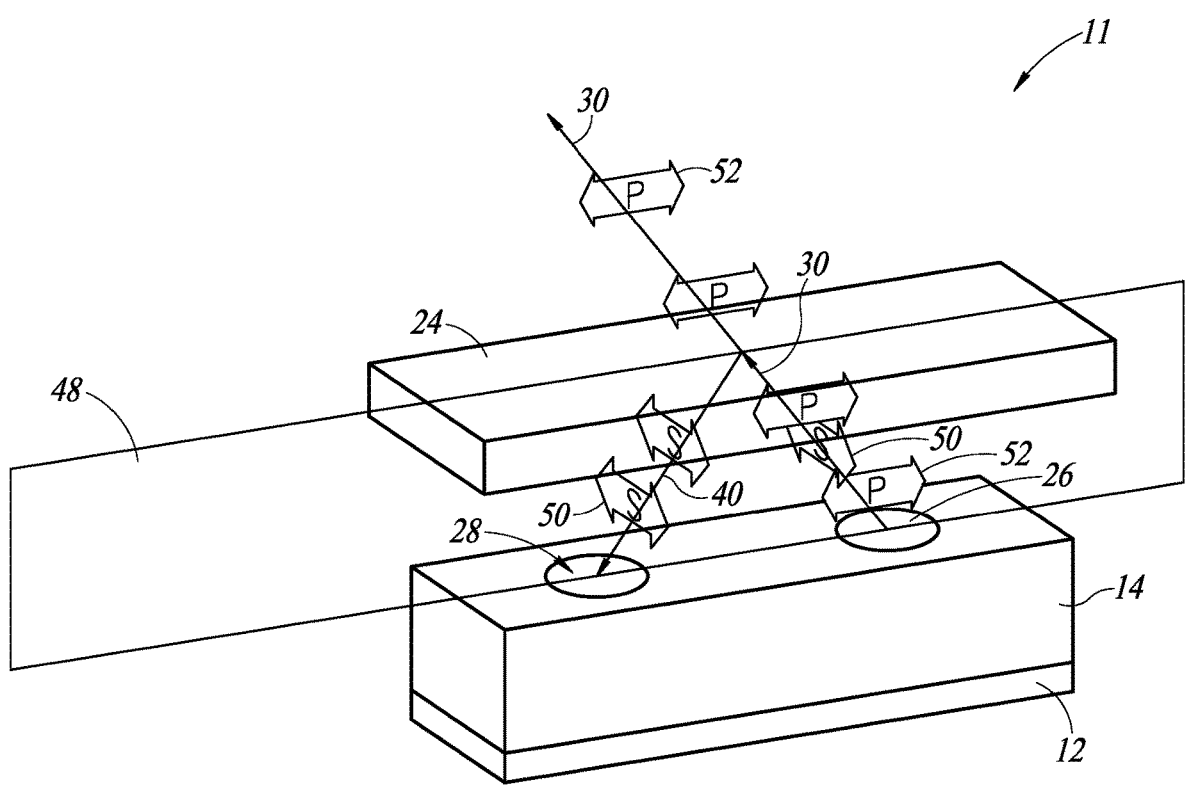
FIG. 2 is a diagram of a light signal transmitted by the sensor of FIG. 1B.

The magnitude of light reflected off of surfaces of the sensor 11 (e.g., the light signal 38, the light signal 40, and the light signal 42) is dependent on the polarization content of the incident light. Generally, the reflection of S-polarized light is stronger than the reflection of P-polarized light. Thus, the amount of reflected light within the sensor 11 (i.e., cross talk) may be reduced by minimizing S-polarization and maximizing P-polarization of light between the output aperture 26 and the detection aperture 28 of the sensor 11. For example, FIG. 2 is a diagram of the light signal 30 signal transmitted by the sensor 11. FIG. 2 illustrates an example of reflection of S-polarized light and P-polarized light of the light signal 30.

A cross talk plane 48 extends across both the output aperture 26 and the detection aperture 28, and is parallel to (or in the same plane as) a plane including the light signal 30 and the light signal 32. The cross talk plane 48 is sometimes referred to as a plane of incidence. S-polarized light 50 is the transverse-electric component of the light signal 30 that extends in a direction perpendicular to the cross talk plane 48. P-polarized light 52 is the transverse-magnetic component of the light signal 30 that extends in a direction parallel to the cross talk plane 48.

Initially, as shown in the example of FIG. 2, the light signal 30 transmitted out of the output aperture 26 includes the S-polarized light 50 and P-polarized light 52. However, as the reflection of S-polarized light is stronger than the reflection of P-polarized light, the light signal 40, which is a portion of the light signal 30 that is reflected off of the upper surface 46 of the cover 24, includes mostly the S-polarized light 50. The S-polarized light 50 is detected by the detector 20 and may cause erroneous ranging errors. In contrast, as the reflection of P-polarized light is weaker than the reflection of S-polarized light, the light signal 30, which continues through the cover 24, includes mostly the P-polarized light 52. Thus, in the example shown in FIG. 2, cross talk may be reduced by minimizing S-polarized light 50 and maximizing the P-polarized light 52.

One possible solution to minimize S-polarized light and maximize P-polarized light is to use polarization filters, such as metal gratings. For example, a polarization filter may be positioned in the path of the light signal 30, and be configured to remove S-polarized light and transmit P-polarized light. Unfortunately, the use of polarization filters are not ideal as polarization filters often reduce efficiency (e.g., reduce the magnitude) of light used to detect a target object. In addition, such filters will often confine light inside the sensor package, and, thus, increase the intra-package crosstalk amplitude Instead of polarization filters, the sensor 10 includes an optical structure and a light source to minimize S-polarized light (e.g., the S-polarized light 50) and maximize P-polarized light (e.g., the P-polarized light 52) within the sensor 10. Namely, the transmission optical structure 18 of the sensor 10 maintains or increases P-polarization components of the light signal 30 by converting S-polarization components of the light signal 30 to P-polarization components, and the light source 16 of the sensor 10 transmits light that has mostly or all P-polarization components. As a result, in contrast to the sensor 11 shown in FIG. 1B, the light signal 38, the light signal 40, and the light signal 42 are minimized or non-existent within the sensor 10 shown in FIG. 1A.

As discussed above, referring to FIG. 1A, the transmission optical structure 18 directly overlies the light source 16, and is aligned with the light source 16 and the output aperture 26. The transmission optical structure 18 maximizes P-polarization and minimizes S-polarization of the light signal 30 to reduce or remove cross talk within the sensor 10, and may include one or more additional optical functions.

Figure 3:
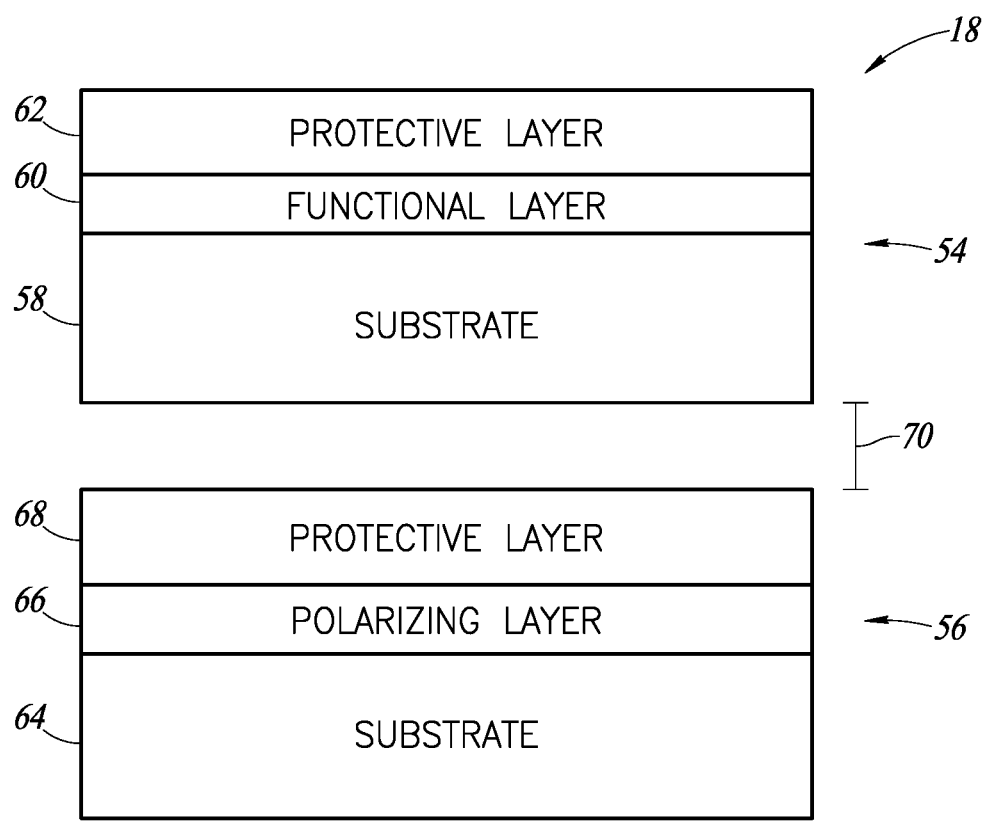
FIG. 3 is a transmission optical structure according to an embodiment disclosed herein.

FIG. 3 is the transmission optical structure 18 according to an embodiment disclosed herein. In the embodiment shown in FIG. 3, the transmission optical structure 18 includes a first optical structure 54 and a second optical structure 56. Referring to FIG. 1A, in one embodiment, the first optical structure 54 and the second optical structure 56 are physically coupled to the body 14.

The first optical structure 54 includes a substrate 58, a functional layer 60 on the substrate 58, and a protective layer 62 on the functional layer 60. The functional layer 60 is positioned between the substrate 58 and the protective layer 62. Referring to FIG. 1A, in one embodiment, the protective layer 62 faces the cover 24. Stated differently, the protective layer 62 is positioned between the cover 24 and the functional layer 60.

The substrate 58 provides a platform for the functional layer 60 and the protective layer 62. In one embodiment, the substrate 58 is made of a rigid, transparent material for a particular wavelength of operation. For example, the substrate 58 may include one or more of silicon dioxide, borosilicate glass, amorphous silicon, polycrystalline silicon, and monocrystalline silicon.

The functional layer 60 has one or more optical functions. In one embodiment, the transmission optical structure 18 has a beam shaping function, an imaging function, a collimating function, a diffusing function, a beam splitting function, a wavefront coding function, or a combination thereof. The functional layer 60 includes a plurality of microstructures with various dimensions to implement the one or more optical functions. In one embodiment, functional layer 60 includes a layer of material covering the microstructures. The layer of material covering the microstructures and the microstructures are made of different materials to create a change in refractive index at the interface of the layer of material and the microstructures and provide the one or more optical functions described above. In one embodiment, the layer of material and the protective layer 62 are made of different materials. In one embodiment, the layer of material is made of the same material as the protective layer 62. In one embodiment, the layer of material is not included in the functional layer 60, and the protective layer 62 instead covers the microstructures. In this embodiment, the microstructures and the protective layer 62 create a change in refractive index at the interface of the protective layer 62 and the microstructures and provide the one or more optical functions described above. In one embodiment, the functional layer 60 is made of two or more of amorphous silicon, polycrystalline silicon, and monocrystalline silicon.

The protective layer 62 encapsulates the functional layer 60 to prevent damage and contamination to the plurality of microstructures of the functional layer 60. In addition, the protective layer 62 provides a robust surface that may be easily cleaned without risk of damaging the functional layer 60. The protective layer 38 may be made of a variety of materials, such as silicon dioxide, silicon nitride, aluminum oxide, or epoxy. In one embodiment, the protective layer 62 is made of the same material as the substrate 58. In one embodiment, the protective layer 62 includes multiple layers having different thicknesses so that transmission of light at particular wavelengths can be optimized.

It is noted that the lower surface of the substrate 58 and the upper surface of the protective layer 62 provide flat, planar surfaces. Thus, one or more additional layers of material, such as an anti-reflective coating or a filter layer, may be formed on the lower surface of the substrate 58 and/or the upper surface of the protective layer 62.

The second optical structure 56 is similar to the first optical structure 54 except that the second optical structure 56 maintains or increases P-polarization of the light signal 30 by converting S-polarization of the light signal 30 to P-polarization. The second optical structure 56 includes a substrate 64, a polarizing layer 66 on the substrate 64, and a protective layer 68 on the polarizing layer 66. The polarizing layer 66 is positioned between the substrate 64 and the protective layer 68. Referring to FIG. 1A, in one embodiment, the protective layer 68 faces the cover 24. Stated differently, the protective layer 68 is positioned between the cover 24 and the polarizing layer 66.

Similar to the substrate 58, the substrate 64 provides a platform for the polarizing layer 66 and the protective layer 68. In one embodiment, the substrate 64 is made of a rigid, transparent material for a particular wavelength of operation. For example, the substrate 64 may include one or more of silicon dioxide, borosilicate glass, amorphous silicon, polycrystalline silicon, and monocrystalline silicon.

The polarizing layer 66 maximizes P-polarization and minimizes S-polarization. For example, referring to FIG. 2, the polarizing layer 66 minimizes the S-polarized light 50 and maximizes the P-polarized light 52. Stated differently, the polarizing layer 66 re-orientates S-polarization components into P-polarization components to convert or impose polarization of unpolarized light to have mostly or all P-polarization. It is noted that the polarizing layer 66 is not a polarization filter, and does not filter or block S-polarized light. Thus, the polarizing layer 66 has better efficiency compared to polarization filters. The polarizing layer 66 includes a plurality of microstructures with various dimensions to implement polarization of unpolarized light. The structure and the fabrication of the polarizing layer 66 will be discussed in further detail below.

Similar to the protective layer 62, the protecting layer 68 encapsulates the polarizing layer 66 to prevent damage and contamination to the plurality of microstructures of the polarizing layer 66. In addition, the protective layer 68 provides a robust surface that may be easily cleaned without risk of damaging the polarizing layer 66. The protective layer 68 may be made of a variety of materials, such as silicon dioxide, silicon nitride, aluminum oxide, or epoxy. In one embodiment, the protective layer 68 is made of the same material as the substrate 64. In one embodiment, the protective layer 68 includes multiple layers having different thicknesses so that transmission of light at particular wavelengths can be optimized.

It is noted that the lower surface of the substrate 64 and the upper surface of the protective layer 68 provide flat, planar surfaces. Thus, one or more additional layers of material, such as an anti-reflective coating or a filter layer, may be formed on the lower surface of the substrate 64 and/or the upper surface of the protective layer 68.

In one embodiment, as shown in FIG. 3, the first optical structure 54 is positioned above the second optical structure 56. Stated differently, referring to FIG. 1A, the first optical structure 54 is positioned closer to the cover 24 than the second optical structure 56. In one embodiment, the second optical structure 56 is positioned above the first optical structure 54.

In one embodiment, as shown in FIG. 3, the first optical structure 54 and the second optical structure 56 are spaced from each other by a distance 70. In one embodiment, the distance 70 is between 100 and 500 micrometers. In one embodiment, the first optical structure 54 and the second optical structure 56 are in direct contact with each other. For example, in one embodiment, the substrate 58 of the first optical structure 54 is in direct contact with the protective layer 68 of the second optical structure 56.

In one embodiment, the transmission optical structure 18 includes the second optical structure 56, but does not include the first optical structure 54. In this embodiment, the transmission optical structure 18 includes the polarization function of the second optical structure 56, but does not include the one or more optical functions of the first optical structure 54.

In one embodiment, the first optical structure 54 does not include the protective layer 62, and the second optical structure 56 does not include the protective layer 68. In this embodiment, the functional layer 60 and the polarizing layer 66 are exposed to a surrounding environment, such as air.

Figure 4:
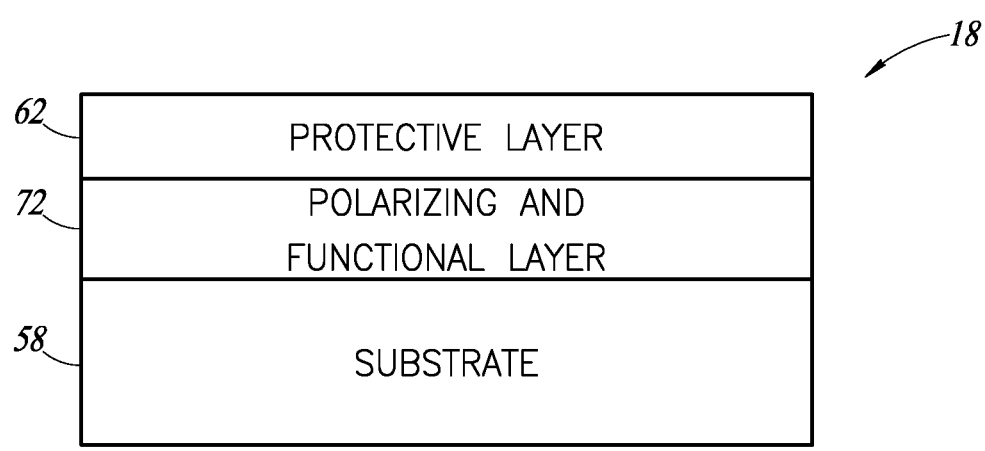
FIG. 4 is a transmission optical structure according to an embodiment disclosed herein.
Figure 5:
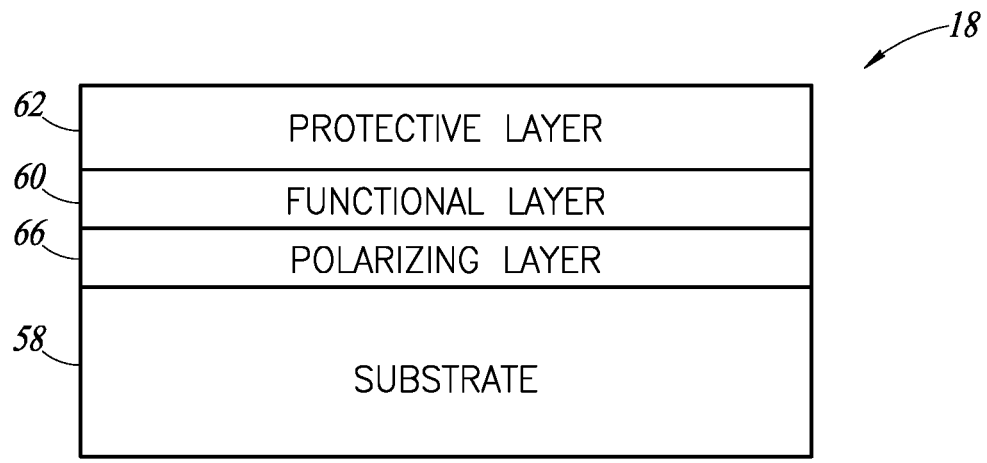
FIG. 5 is a transmission optical structure according to an embodiment disclosed herein.
Figure 6:
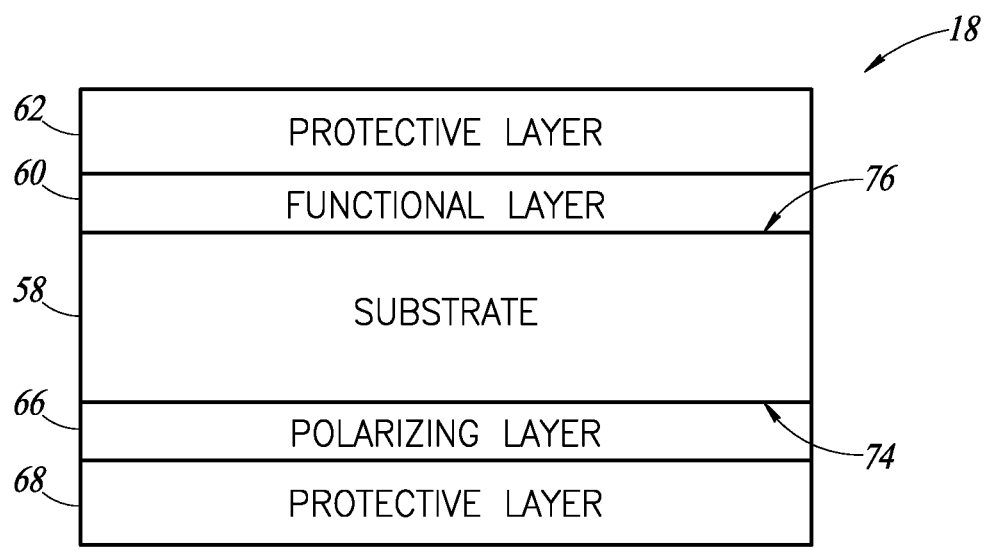
FIG. 6 is a transmission optical structure according to an embodiment disclosed herein.

Other configurations for the transmission optical structure 18 are also possible. FIG. 4, FIG. 5, and FIG. 6 illustrate other possible configurations of the transmission optical structure 18.

FIG. 4 is the transmission optical structure 18 according to an embodiment disclosed herein. In contrast to the embodiment shown in FIG. 3, in the embodiment shown in FIG. 4, the functional layer 60 and the polarizing layer 66 are combined into a single layer. The transmission optical structure 18 shown in FIG. 4 includes the substrate 58, a polarizing and functional layer 72 on the substrate 58, and the protective layer 62 on the polarizing and functional layer 72. The polarizing and functional layer 72 is positioned between the substrate 58 and the protective layer 62. The substrate 58 and the protective layer 62 have been described above.

The polarizing and functional layer 72 is a single layer that provides the functionality of both the functional layer 60 and the polarizing layer 66. Stated differently, the polarizing and functional layer 72 concurrently provides one or more optical functions similar to that of the functional layer 60, and polarization similar to that of the polarizing layer 66. In one embodiment, the polarizing and functional layer 72 maximizes P-polarization and minimizes S-polarization; and provides a beam shaping function, an imaging function, a collimating function, a diffusing function, a polarizing function, a beam splitting function, a wavefront coding function, or a combination thereof.

In one embodiment, the transmission optical structure 18 shown in FIG. 4 does not include the protective layer 62. In this embodiment, the polarizing and functional layer 72 is exposed to a surrounding environment, such as air.

FIG. 5 is the transmission optical structure 18 according to an embodiment disclosed herein. In contrast to the embodiment shown in FIG. 3, in the embodiment shown in FIG. 5, the functional layer 60 and the polarizing layer 66 are positioned on the same substrate. The transmission optical structure 18 shown in FIG. 5 includes the substrate 58, the polarizing layer 66 on the substrate 58, the functional layer 60 on the polarizing layer 66, and the protective layer 62 on the functional layer 60. The substrate 58, the polarizing layer 66, the functional layer 60, and the protective layer 62 have been described above.

In one embodiment, as shown in FIG. 5, the functional layer 60 is positioned above the polarizing layer 66. Stated differently, referring to FIG. 1A, the functional layer 60 is positioned closer to the cover 24 than the polarizing layer 66. In one embodiment, the polarizing layer 66 is positioned above the functional layer 60.

In one embodiment, the transmission optical structure 18 shown in FIG. 5 does not include the protective layer 62. In this embodiment, the functional layer 60 is exposed to a surrounding environment, such as air.

FIG. 6 is the transmission optical structure 18 according to an embodiment disclosed herein. In contrast to the embodiment shown in FIG. 3, in the embodiment shown in FIG. 6, the functional layer 60 and the polarizing layer 66 are positioned on opposite sides of the same substrate. The transmission optical structure 18 shown in FIG. 6 includes the substrate 58, the polarizing layer 66 on a first surface 74 of the substrate 58, the functional layer 60 on a second surface 76 of the substrate 58, the protective layer 62 on the functional layer 60, and the protective layer 68 on the polarizing layer 66. The substrate 58, the polarizing layer 66, the functional layer 60, the protective layer 62, and the protective layer 68 have been described above.

The first surface 74 and the second surface 76 of the substrate 58 face in opposite directions. In one embodiment, referring to FIG. 1A, the first surface 74 faces the cover 24 and the second surface 76 faces the substrate 12. In one embodiment, the first surface 74 faces the substrate 12 and the second surface 76 faces the cover 24.

In one embodiment, the transmission optical structure 18 shown in FIG. 6 does not include the protective layer 62 and the protective layer 68. In this embodiment, the functional layer 60 and the polarizing layer 66 are exposed to a surrounding environment, such as air.

In one embodiment, the polarization function of the transmission optical structure 18 is implemented by a microstructure layer. For example, the polarizing layer 66 in FIG. 3, the polarizing and functional layer 72 in FIG. 4, the polarizing layer 66 in FIG. 5, and the polarizing layer 66 in FIG. 6 may each be a microstructure layer including a plurality of microstructures.

Figure 7:
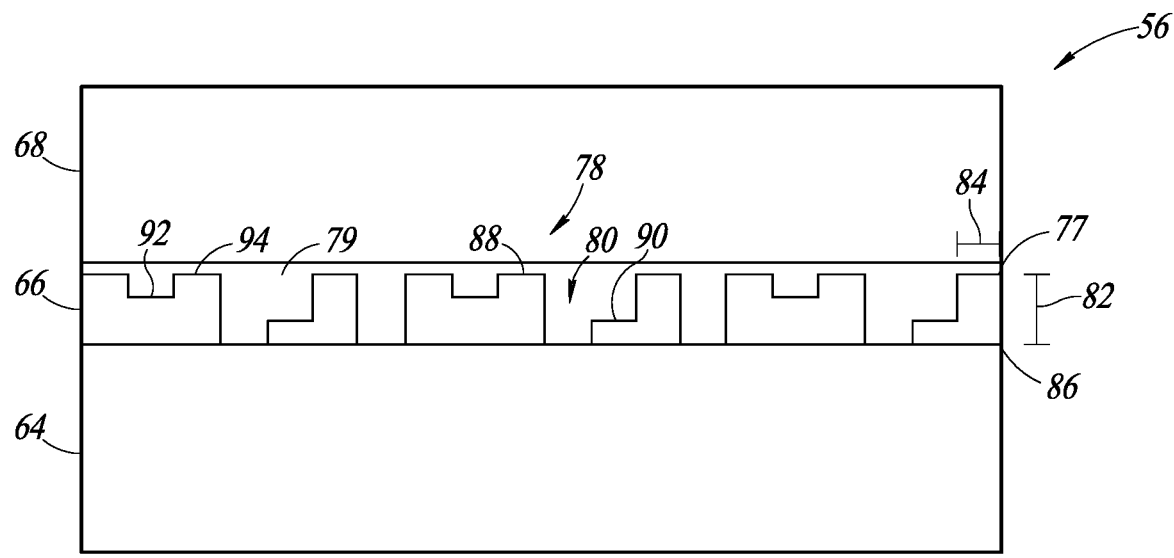
FIG. 7 illustrates a polarizing layer for a transmission optical structure according to an embodiment disclosed herein.
Figure 8:
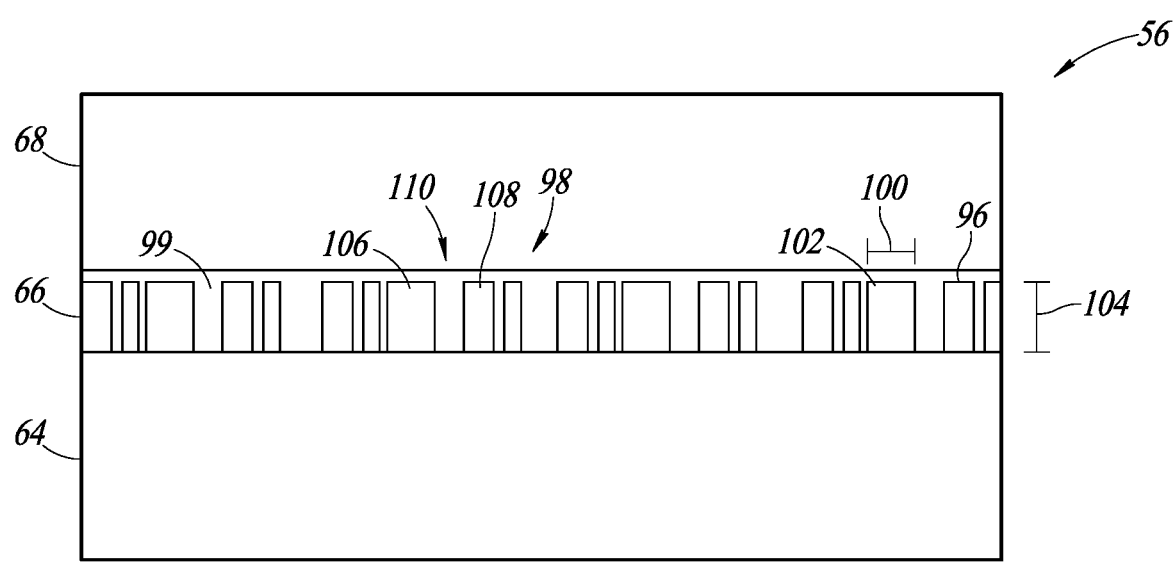
FIG. 8 illustrates a polarizing layer for a transmission optical structure according to an embodiment disclosed herein.

FIGS. 7 and 8 illustrate two different microstructure layers having a polarizing function. In the embodiments shown in FIGS. 7 and 8, the polarizing layer 66 of FIG. 3 is used for exemplary purposes. In particular, the microstructure layers in FIG. 7 and FIG. 8 correspond to the polarizing layer 66 in the second optical structure 56 of FIG. 3. However, the microstructure layers shown in FIG. 7 and FIG. 8 may be used for any of the embodiments disclosed herein.

FIG. 7 illustrates the polarizing layer 66 for the transmission optical structure 18 according to an embodiment disclosed herein. As discussed above with respect to FIG. 3, the polarizing layer 66 is on the substrate 64, and the protective layer 68 is on the polarizing layer 66. The polarizing layer 66 maximizes P-polarization and minimizes S-polarization.

The polarizing layer 66 includes a microstructure layer 77 having a plurality of microstructures 78. The microstructures 78 have various heights and widths. The heights and widths of the microstructures 78 are selected to provide the polarization properties of the polarizing layer 66. Stated differently, the heights and widths of the microstructures 78 are selected to have a corralling property to convert or impose polarization of unpolarized light transmitted through the microstructure layer 77 to have mostly or all P-polarization. The selection of the dimensions of the microstructures will be discussed in further detail below.

In one embodiment, the microstructures 78 have near wavelength scale features. Namely, the dimensions of the heights and widths of the microstructures 78 are within a predetermined range of the wavelength of light transmitted by the light source 16. For example, in one embodiment, the light source 16 transmits an infrared or near infrared light, which has a wavelength between 700 nanometers and 1 millimeter. In this embodiment, the dimensions of the heights and widths of each of the microstructures 78 are between 700 nanometers and 1 millimeter. For example, a height 82 and a width 84 of a microstructure 86 may be between 700 nanometers and 1 millimeter. In one embodiment, as shown in FIG. 7, the microstructures 78 include microstructures having at least three different heights. In one embodiment, the microstructures 78 include microstructures having the same width.

In one embodiment, one or more of the microstructures 78 are spaced from each other on the substrate 64. For example, a microstructure 88 is separated from a microstructure 90 by an upper layer (e.g., a layer of material 79, which will be described below, or the protective layer 68) such that there is a space or gap 80 that exposes the substrate 64 to the upper layer. In one embodiment, some or all of the microstructures 78 are physically coupled to each other. For example, a microstructure 92 is attached to a microstructure 94 such that there is no space or gap that exposes the substrate 64 to the upper layer.

In one embodiment, the microstructure layer 77 provides one or more optical functions (e.g., a beam shaping function, an imaging function, a collimating function, a diffusing function, a beam splitting function, a wavefront coding function, or a combination thereof) in addition to polarization. For example, in one embodiment, the microstructures 78 of the microstructure layer 77 are used to implement the polarizing and functional layer 72 in the embodiment shown in FIG. 4. In this embodiment, the microstructure layer 77 concurrently provides one or more optical functions similar to that of the functional layer 60, and polarization similar to that of the polarizing layer 66.

In one embodiment, the polarizing layer 66 includes the layer of material 79 that covers the microstructure layer 77 and fills spaces or gaps 80 between the microstructures 78. The layer of material 79 separates the microstructure layer 77 from the protective layer 68. The layer of material 79 and the microstructures 78 are made of different materials to create a change in refractive index at the interface of the layer of material 79 and the microstructures 78 and provide the one or more optical functions described above. In one embodiment, the layer of material 79 and the protective layer 68 are made of different materials. In one embodiment, the layer of material 79 is made of the same material as the protective layer 68. In one embodiment, the layer of material 79 is not included in the polarizing layer 66 and the protective layer 66 instead covers the microstructure layer 77 and fills the space or gaps 80 between the microstructures 78. In this embodiment, the microstructures 78 and the protective layer 66 create a change in refractive index at the interface of the protective layer 66 and the microstructures 78 and provide the one or more optical functions described above.

FIG. 8 illustrates the polarizing layer 66 for the transmission optical structure 18 according to an embodiment disclosed herein. As discussed above with respect to FIG. 3, the polarizing layer 66 is on the substrate 64, and the protective layer 68 is on the polarizing layer 66. The polarizing layer 66 maximizes P-polarization and minimizes S-polarization.

The polarizing layer 66 includes a microstructure layer 96 having a plurality of microstructures 98. In contrast to the microstructures 78 in the embodiment shown in FIG. 7, the microstructures 98 have a grating pattern. Namely, the microstructures 98 have various widths but the same height. The widths and the height of the microstructures 98 are selected to provide the polarization properties of the polarizing layer 66. Stated differently, the widths and the height of the microstructures 98 are selected to have a corralling property to convert or impose polarization of unpolarized light transmitted through the microstructure layer 96 to have mostly or all P-polarization. The selection of the dimensions of the microstructures will be discussed in further detail below.

In one embodiment, the microstructures 98 have sub-wavelength scale features. Namely, the dimensions of the heights and widths of the microstructures 78 are outside of a predetermined range of the wavelength of light transmitted by the light source 16. For example, in one embodiment, the light source 16 transmits an infrared or near infrared light, which has a wavelength between 700 nanometers and 1 millimeter. In this embodiment, the dimensions of the heights and widths of each of the microstructures 78 are less than 700 nanometers. For example, a width 100 of a microstructure 102 may be less than 700 nanometers, and a height 104 of all of the microstructures 98 may be less than 700 nanometers. In one embodiment, as shown in FIG. 7, the microstructures 98 include microstructures having at least three different widths. In one embodiment, the microstructures 98 include microstructures having the same width.

In one embodiment, one or more of the microstructures 98 are spaced from each other on the substrate 64. For example, a microstructure 106 is separated from a microstructure 108 by an upper layer (e.g., a layer of material 99, which will be described below, or the protective layer 68) such that there is a space or gap 110 that exposes the substrate 64 to the upper layer.

In one embodiment, the microstructure layer 96 provides one or more optical functions (e.g., a beam shaping function, an imaging function, a collimating function, a diffusing function, a beam splitting function, a wavefront coding function, or a combination thereof) in addition to polarization. For example, in one embodiment, the microstructures 98 of the microstructure layer 96 are used to implement the polarizing and functional layer 72 in the embodiment shown in FIG. 4. In this embodiment, the microstructure layer 96 concurrently provides one or more optical functions similar to that of the functional layer 60, and polarization similar to that of the polarizing layer 66.

In one embodiment, the polarizing layer 66 includes the layer of material 99 that covers the microstructure layer 96 and fills spaces or gaps 110 between the microstructures 98. The layer of material 99 separates the microstructure layer 96 from the protective layer 68. The layer of material 99 and the microstructures 98 are made of different materials to create a change in refractive index at the interface of the layer of material 99 and the microstructures 98 and provide the one or more optical functions described above. In one embodiment, the layer of material 99 and the protective layer 68 are made of different materials. In one embodiment, the layer of material 99 is made of the same material as the protective layer 68. In one embodiment, the layer of material 79 is not included in the polarizing layer 66 and the protective layer 66 instead covers the microstructure layer 96 and fills the space or gaps 110 between the microstructures 98. In this embodiment, the microstructures 98 and the protective layer 66 create a change in refractive index at the interface of the protective layer 66 and the microstructures 98 and provide the one or more optical functions described above.

A variety of semiconductor processing techniques may be used to form the microstructure layer 77 and the microstructure layer 96. For example, a single thick layer can be formed and then etched to form the different microstructures using a plurality of different masks. Alternatively, a microstructure layer may be formed from a plurality of layers that are formed and etched consecutively.

FIGS. 9A, 9B, 9C, and 9D are cross-sectional views illustrating subsequent stages of fabricating a polarizing layer, such as the polarizing layer 66 and the polarizing and functional layer 72, for the transmission optical structure 18, according to an embodiment disclosed herein. In the embodiment shown in FIGS. 9A, 9B, 9C, and 9D, the polarizing layer 66 of FIG. 8 is used for exemplary purposes. In particular, the fabricated microstructure layer in FIGS. 9A, 9B, 9C, and 9D corresponds to the microstructure layer 96 of FIG. 8, albeit having different dimensions. However, the stages of fabricating a polarizing layer shown in FIGS. 9A, 9B, 9C, and 9D may be used for any of the embodiments disclosed herein.

Figure 9A:
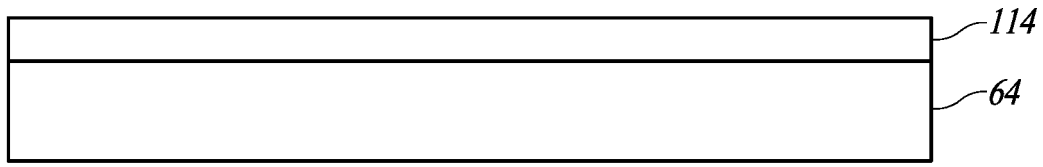
FIGS. 9A, 9B, 9C, and 9D are cross-sectional views illustrating subsequent stages of fabricating a polarizing layer for a transmission optical structure according to an embodiment disclosed herein.

In FIG. 9A, a first layer 114 of material is formed on the substrate 64. The first layer 114 is used to form the microstructure layer 96 for the polarizing layer 66 of FIG. 8. The first layer 114 may be formed using various semiconductor processing techniques, such as sputtering, chemical vapor deposition, or plasma vapor deposition. This allows a manufacturer to use existing semiconductor processing machines for forming the transmission optical structure 18.

In one embodiment, the layer 114 of material is made of one or more of the following: silicon (Si), silicon dioxide, (SiO2), zinc sulphide (ZnS), galium nitride (GaN), zinc selenide (ZnSe), titanium dioxide (TiO2), silicon carbide (SiC), gallium phosphide (GaP), gallium arsenide (GaAs), and hydrogenated silicon (Si:H).

In one embodiment, as discussed above, the substrate 64 is made of a transparent, rigid material. For example, the substrate 64 may include one or more of silicon dioxide, borosilicate glass, amorphous silicon, polycrystalline silicon, and monocrystalline silicon.

Figure 9B:
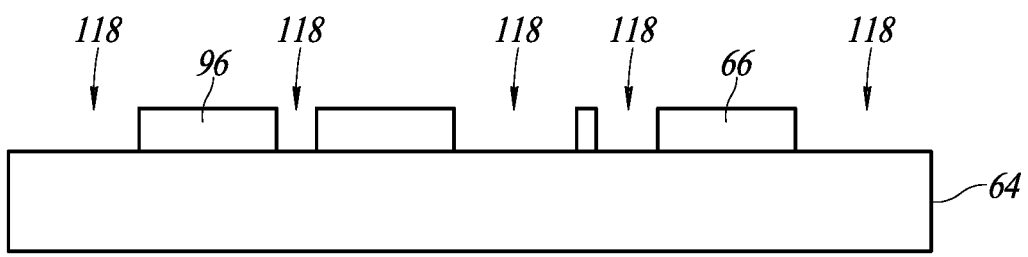

In FIG. 9B, the layer 114 of material is patterned and etched to form the microstructure layer 96 of the polarizing layer 66. Namely, portions of the layer 114 are removed to expose the substrate 64 and form openings 118. The openings 118 may be formed using masking techniques or other standard semiconductor processing techniques for masking and removing materials. For example, portions of the layer 114 may be removed by chemical etching. As discussed above, the microstructure layer 96 includes a grating pattern having microstructures with various widths but the same height. The selection of the dimensions of the microstructures will be discussed in further detail below.

In an alternative embodiment, the layer 114 of the microstructure layer 96 as shown in FIG. 9B is formed by using a pattern deposition. This may be achieved with a photoresist deposition process. Positive or negative photolithography may be used for masking techniques.

Figure 9C:
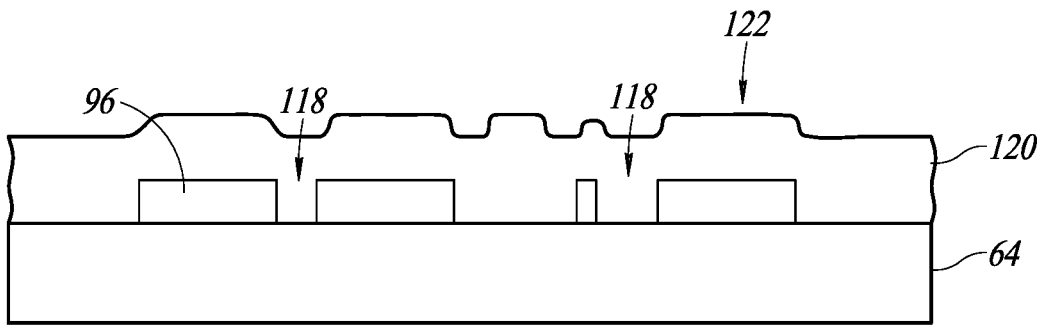
Figure 9D:
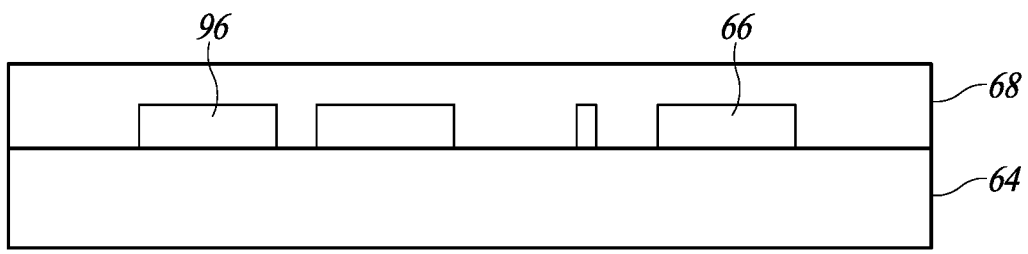

In FIG. 9C, a layer 120 of material is formed on the layer 114 of the microstructure layer 96, in the openings 118, and on the exposed surface of the substrate 64. The layer 120 is used to form the protective layer 68 of FIG. 8. The layer 120 may be formed using various semiconductor processing techniques, such as sputtering, chemical vapor deposition, or plasma vapor deposition. The layer 120 may be made of a variety of materials, such as silicon dioxide, silicon nitride, aluminum oxide, or epoxy.

As shown in FIG. 9C, once the layer 120 is formed, an upper surface 122 may be uneven (i.e., not planar). The uneven surface of the upper surface 122 may reduce or inhibit the polarization properties of the microstructure layer 96. To avoid this, in FIG. 9D, the upper surface 122 of the layer 120 is planarized to smooth, planar upper surface. The upper surface 122 may be planarized using various semiconductor processing techniques, such as chemical-mechanical polishing.

Although FIGS. 9A, 9B, 9C, and 9D illustrate subsequent stages of fabricating the polarizing layer 66 of FIG. 8, the fabrication steps shown in FIGS. 9A, 9B, 9C, and 9D may be applied to any of the embodiments disclosed herein. For example, in order to fabricate the microstructure layer 77, which includes various heights and widths, shown in FIG. 7, the fabrication steps shown in FIGS. 9A, 9B, 9C, and 9D may be repeated to form additional layers for the microstructures 78. Stated differently, a plurality of layers of material (e.g., the layer 114) may be formed and etched consecutively until the microstructure layer 77 is obtained.

Figure 10:
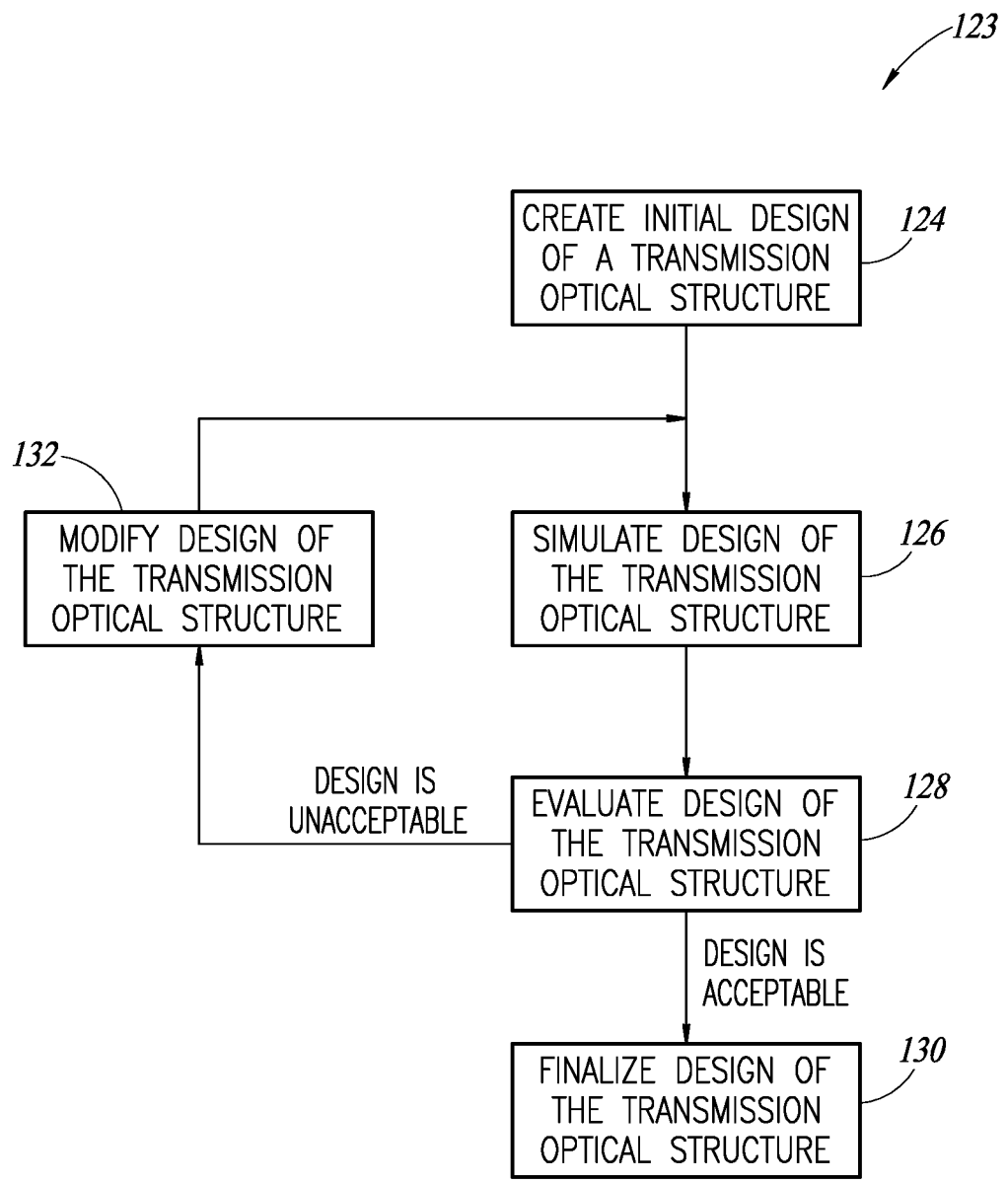
FIG. 10 is a flow diagram illustrating a process for designing a polarizing layer for a transmission optical structure according to an embodiment disclosed herein.

As discussed above, each of the polarizing layer 66 and the polarizing and functional layer 72 includes a microstructure layer having a plurality of microstructures. The microstructures have various heights and/or widths to provide the polarization properties. In one embodiment, a global search algorithm is used to select the heights and/or widths of the microstructures to have a corralling property to convert or impose polarization of unpolarized light to have mostly or all P-polarization. For example, FIG. 10 is a flow diagram illustrating a process 123 for designing a polarizing layer, such as the polarizing layer 66 and the polarizing and functional layer 72, for the transmission optical structure 18 according to an embodiment disclosed herein.

In block 124, an initial design of the transmission optical structure 18 is created. This includes selecting initial dimensions for the various layers in the transmission optical structure 18. For instance, the thickness of each of the layers (e.g., the substrate 58, the functional layer 60, the protective layer 62, the substrate 64, the polarizing layer 66, and the protective layer 68 of the embodiment shown in FIG. 3), and the heights and/or widths of the microstructures of the polarizing and functional layers (e.g., the functional layer 60 and the polarizing layer 66 of the embodiment shown in FIG. 3) may be selected.

In block 126, the initial design of the transmission optical structure 18 is simulated. The initial design of the transmission optical structure 18 may be simulated using various simulation techniques, such as computer, mathematical, or visual simulation techniques.

In block 128, the initial design of the transmission optical structure 18 is evaluated based on the simulation performed in the block 126. For example, the performance of the polarizing layer (e.g., the polarizing layer 66 of the embodiment shown in FIG. 3) may be evaluated based on the simulation to determine whether the various heights and/or widths of the microstructures provide mostly or all P-polarization. As another example, the performance of the functional layer (e.g., the functional layer 60 of the embodiment shown in FIG. 3) may be evaluated based on the simulation to determine whether the various heights and/or widths of the microstructures provide the proper optical function (e.g., a beam shaping function, an imaging function, a collimating function, a diffusing function, a polarizing function, a beam splitting function, a wavefront coding function, or a combination thereof).

If the initial design is acceptable, the process 123 proceeds to block 130. If the initial design is unacceptable, the process 123 proceeds to block 132.

In block 130, the initial design of the transmission optical structure 18 is finalized. Once finalized, the transmission optical structure 18 may then be fabricated using, for example, the process described with respect to FIGS. 9A, 9B, 9C, and 9D.

In block 132, the initial design of the transmission optical structure 18 is modified. For example, the initial dimensions for the various layers in the transmission optical structure 18 may be modified. For instance, the thickness of each of the layers (e.g., the substrate 58, the functional layer 60, the protective layer 62, the substrate 64, the polarizing layer 66, and the protective layer 68 of the embodiment shown in FIG. 3), and the heights and/or widths of the microstructures of the polarizing and functional layers (e.g., the functional layer 60 and the polarizing layer 66 of the embodiment shown in FIG. 3) may be modified. Subsequently, the process 123 returns to block 126, where the modified design of the transmission optical structure 18 is simulated.

In addition to the transmission optical structure 18, the light source 16 is also configured to minimize S-polarized light (e.g., the S-polarized light 50) and maximize P-polarized light (e.g., the P-polarized light 52) within the sensor 10. Namely, the light source 16 emits light (e.g., the light signal 30) that has mostly or all P-polarization.

As discussed above, the light source 16 is positioned on the substrate 12, and directly underlies the transmission optical structure 18 and the output aperture 26. The light source 16 emits the light signal 30 through the transmission optical structure 18 and the output aperture 26. In one embodiment, the light source 16 is an infrared or near infrared light source, such as a vertical-cavity surface-emitting laser (VCSEL).

Figure 11:
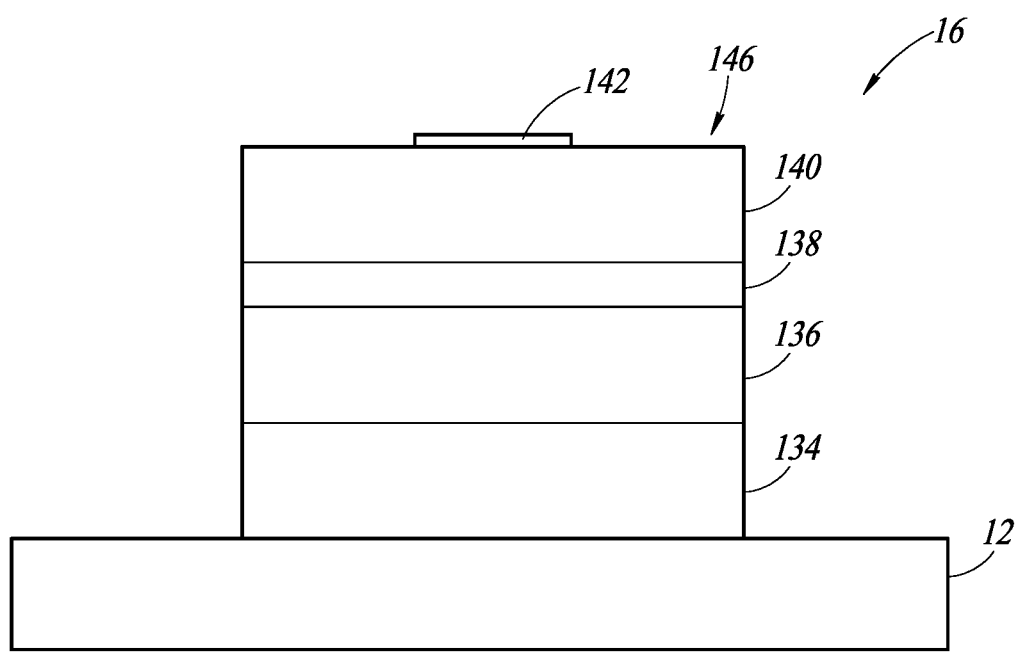
FIG. 11 is a side view of a light source according to an embodiment disclosed herein.
Figure 12:
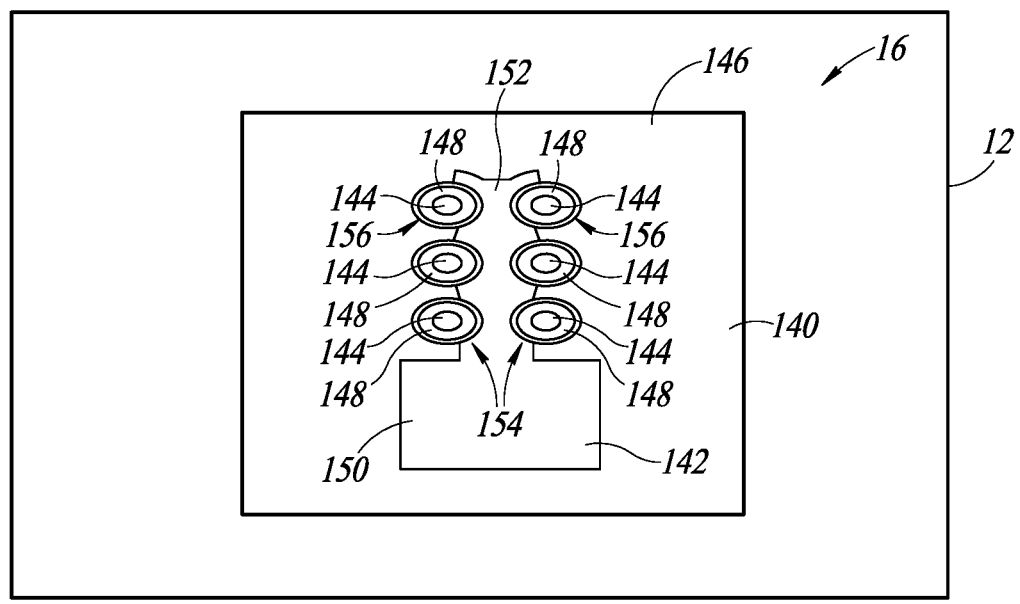
FIG. 12 is a top view of the light source of FIG. 11 according to an embodiment disclosed herein.

FIG. 11 is a side view of the light source 16 according to an embodiment disclosed herein. FIG. 12 is a top view of the light source 16 according to an embodiment disclosed herein. It is beneficial to review FIGS. 11 and 12 together. The light source 16 includes a substrate 134 on the substrate 12, a first mirror 136 on the substrate 134, an active layer 138 on the first mirror 136, a second mirror 140 on the active layer 138, a conductive contact 142 on the second mirror 140, and emitters 144 on or in the second mirror 140.

The substrate 134 of the light source 16 is positioned on the substrate 12 of the sensor 10. In one embodiment, the substrate 134 is a semiconductor substrate.

The first mirror 136 and the second mirror 140 are highly reflective mirrors. In one embodiment, each of the first mirror 136 and the second mirror 140 has reflectivity between 99 and 99.9%. In one embodiment, the first mirror 136 has a higher reflectivity than the second mirror 140. In one embodiment, the first mirror 136 and the second mirror 140 are distributed Bragg reflectors.

The active layer 138 is positioned between the first mirror 136 and the second mirror 140. The active layer 138 includes one or more laser cavities. In one embodiment, the active layer 138 includes one or more quantum wells. The active layer 138 generates light when an electrical signal is applied to the active layer 138.

In one embodiment, the first mirror 136 and the second mirror 140 are oppositely doped from each other such that the first mirror 136, the active layer 138, and the second mirror 140 forms a p-i-n junction. For example, in one embodiment, the first mirror 136 has an n-type conductivity type and the second mirror 140 has a p-type conductivity type. Conversely, in another embodiment, the first mirror 136 has a p-type conductivity type and the second mirror 140 has an n-type conductivity type. In one embodiment, the substrate 134 has the same conductivity type as the first mirror 136.

The conductive contact 142 is formed on an upper surface 146 of the second mirror 140. The conductive contact 142 is made of a conductive material, such as gold. The conductive contact 142 receives an electrical signal (e.g., voltage or current signal) from a driver circuit positioned on, for example, the substrate 12. Although not shown in FIG. 11, the light source 16 may include another conductive contact to receive an electrical signal. For example, in one embodiment, the light source 16 includes a conductive contact formed between the substrate 12 and the substrate 134. As will be discussed in further detail below, the conductive contact 142 surrounds one side of the emitters 144.

The emitters 144 are formed on or in the second mirror 140. The emitters 144 provide windows for light generated by the active layer 138 to be emitted from. In one embodiment, the shape of the emitters 144 are formed by one or more blocking layers formed within the light source 16. For example, as shown in FIG. 12, the emitters 144 may be windows (i.e., through holes) formed in an oxide layer 148. The oxide layer 148 may be positioned between the active layer 138 and the second mirror 140, between the active layer 138 and the first mirror 136, between the substrate 134 and the first mirror 136, and/or on the upper surface 146 of the second mirror 140. Although six emitters are shown in FIG. 12, the light source 16 may include any number of emitters. As will be discussed in further detail below, the emitters 144 are asymmetric.

In operation, the conductive contact 142 receives an electrical signal (e.g., voltage or current signal) from a driver circuit positioned on, for example, the substrate 12. In response, photons are generated by the quantum well of the active layer 138. As the first mirror 136 and the second mirror 140 are highly reflective, the photons bounce between the first mirror 136 and the second mirror 140, and are emitted from the emitters 144 and out of the upper surface 146 of the second mirror 140 as a concentrated light signal.

The light source 16 is configured to minimize S-polarized light (e.g., the S-polarized light 50) and maximize P-polarized light (e.g., the P-polarized light 52) of the light signal emitted from the light source 16. Stated differently, the light signal emitted from the light source 16 has mostly or all P-polarization. The polarization of the light emitted by the light source 16 is manipulated by controlling the direction of charge carrier motion in the lasing cavity (e.g., the active layer 138) of the light source 16, and controlling the spatial modes available for lasing.

The direction of charge carrier motion in the lasing cavity of the light source 16 is controlled by the shape of the conductive contact 142. Namely, the conductive contact 142 is shaped such that charge injection is performed from a single side of the emitters 144. For example, as shown in FIG. 12, the conductive contact 142 includes a contact portion 150 and an emitter portion 152. The contact portion 150 is positioned laterally to the emitters 144 and receives the electrical signal from the driver circuit. The emitter portion 152 extends from the contract portion 150 and is positioned on a single side (sides 154) of the emitters 144. The emitter portion 152 is not positioned on the opposite side (sides 156) of the emitters 144. Stated differently, the contact portion 150 partially surrounds and is immediately adjacent to the emitters 144. In one embodiment, the contact portion 150 surrounds less than 50 percent of the outer edge or border of each of the emitters 144. In one embodiment, as shown in FIG. 12, the emitter portion 152 extends between two columns of emitters 144. In one embodiment, the emitter portion 152 has a smaller surface area than the contact portion 150. The configuration of the conductive contact 142 allows charge injection from one side of the emitters 144, and polarizes the light signal emitted from the light source 16 to have mostly or all P-polarization.

The spatial modes available for lasing are controlled by the shape of the emitters 144. Namely, the emitters 144 are shaped to be asymmetrical about at least one axis. For example, as shown in FIG. 12, the emitters 144 are oval shaped and are asymmetrical about at least one axis. In one embodiment, the emitters 144 do not have a circular or square shape. The asymmetric shape of the emitters 144 polarizes the light signal emitted from the light source 16 to have mostly or all P-polarization. Although the emitters 144 are oval shaped in FIG. 12, other asymmetrical shapes are possible. For example, the emitter 144 may have a triangular shape or a polygonal shape.

Figure 13:
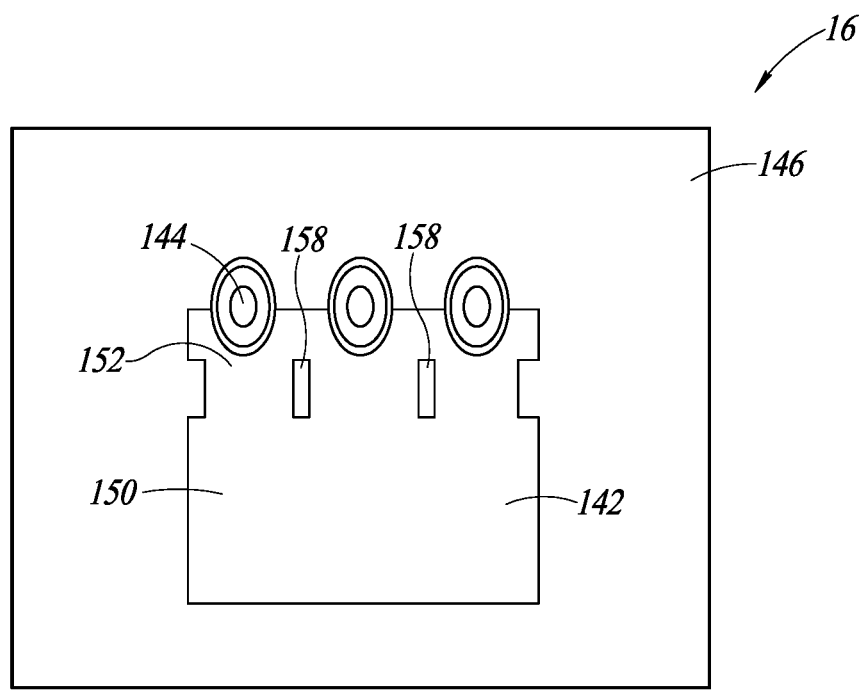
FIG. 13 is a top view of the light source of FIG. 11 according to an embodiment disclosed herein.
Figure 14:
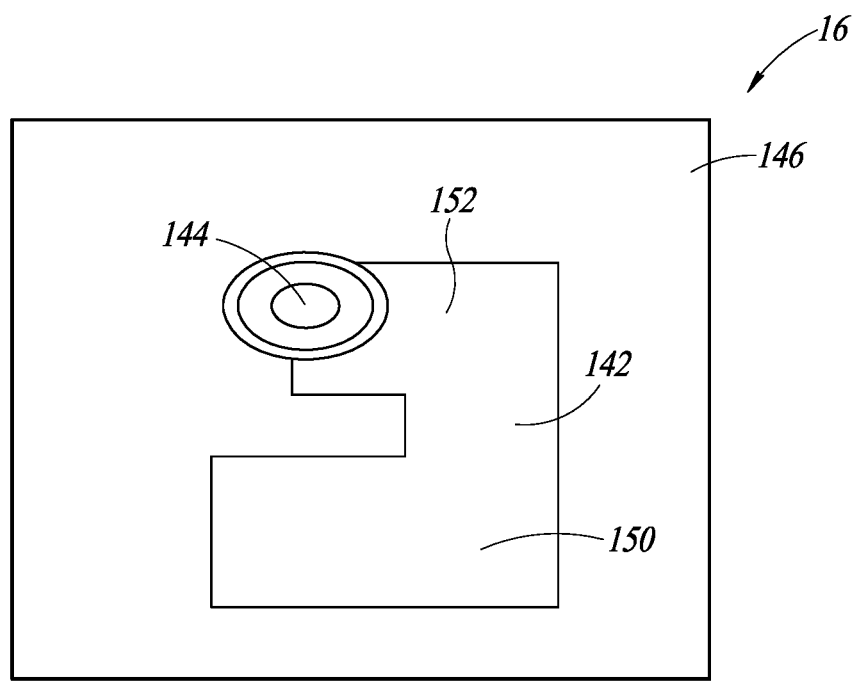
FIG. 14 is a top view of the light source of FIG. 11 according to an embodiment disclosed herein.

Other possible configurations for the conductive contact and the emitter are possible. FIGS. 13 and 14 show other configurations in which the conductive contact is positioned on one side of the emitters, and the emitters have an asymmetrical shape.

FIG. 13 is a top view of the light source 16 according to an embodiment disclosed herein. Similar to the embodiment shown in FIG. 12, the conductive contact 142 is shaped such that charge injection is performed from a single side of the emitters 144, and the emitters 144 are asymmetric about at least one axis. However, in contrast to the embodiment shown in FIG. 12, the contact portion 150 and the emitter portion 152 of the conductive contact 142 are positioned on a single side of the emitters 144. In one embodiment, the emitter portion 152 has a smaller surface area than the contact portion 150. In one embodiment, as shown in FIG. 13, the emitter portion 152 includes openings 158 positioned between each of the emitters 144.

FIG. 14 is a top view of the light source 16 according to an embodiment disclosed herein. Similar to the embodiment shown in FIG. 12, the conductive contact 142 is shaped such that charge injection is performed from a single side of the emitter 144, and the emitter 144 is asymmetric about at least one axis. However, in contrast to the embodiment shown in FIG. 12, the contact portion 150 of the conductive contact 142 is L-shaped. Stated differently, the contact portion 150 extends in a first direction and a second direction transverse to the first direction. Further, the light source 16 includes a single emitter. In one embodiment, the emitter portion 152 has a smaller surface area than the contact portion 150.

Figure 15:
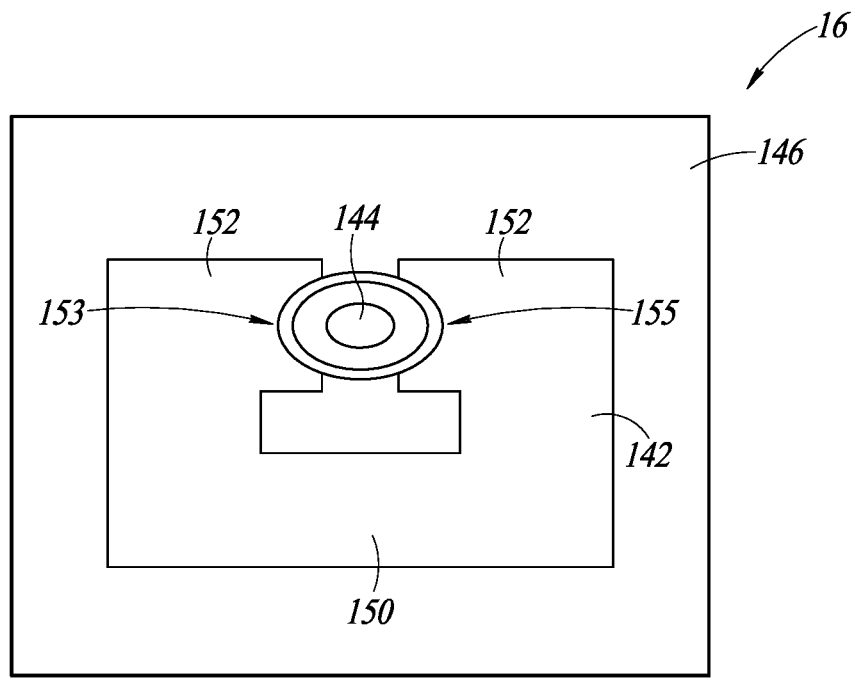
FIG. 15 is a top view of the light source of FIG. 11 according to an embodiment disclosed herein.
Figure 16:
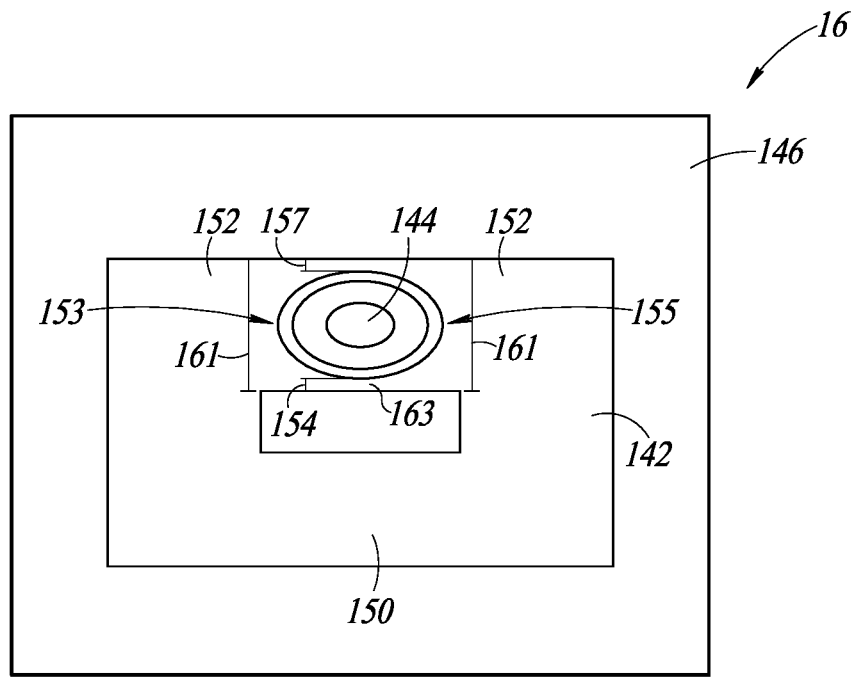
FIG. 16 is a top view of the light source of FIG. 11 according to an embodiment disclosed herein.

In one embodiment, the conductive contact 142 is shaped such that charge injection is performed from two sides of the emitters 144 that are positioned along the same axis. This configuration of the conductive contact 142 allows charge injection of the emitters 144 along a single axis, and polarizes the light signal emitted from the light source 16 to have mostly or all P-polarization. FIGS. 15 and 16 show configurations in which the conductive contact is positioned on two sides of the emitters that are positioned along the same axis.

FIG. 15 is a top view of the light source 16 according to an embodiment disclosed herein. Similar to the embodiment shown in FIG. 12, the emitter 144 is asymmetric about at least one axis. However, in contrast to the embodiment shown in FIG. 12, the conductive contact 142 is shaped such that charge injection is performed from two opposite sides of the emitter 144 that are aligned with each other. Stated differently, the conductive contact 142 includes two emitter portions 152 that surround a first side 153 of the emitter 144 and a second side 155, opposite to the first side 153, of the emitter 144. The remaining portions of the emitter 144 are not surrounded and do not contact the two emitter portions 152. This configuration of the conductive contact 142 allows charge injection of the emitter 144 along a single axis, and polarizes the light signal emitted from the light source 16 to have mostly or all P-polarization.

FIG. 16 is a top view of the light source 16 according to an embodiment disclosed herein. Similar to the embodiment shown in FIG. 15, the emitter 144 is asymmetric about at least one axis, and the conductive contact 142 is shaped such that charge injection is performed from two opposite sides 153, 155 of the emitter 144. However, in contrast to the embodiment shown in FIG. 15, the remaining portions of the emitter 144 are surrounded by the conductive contract 142. Namely, the conductive contact 12 includes a portion 163 and a portion 165 that surround the lower and upper sides of the emitter 144, respectively. The portion 163 has a width 159, and the portion 165 has a width 157. The widths 157, 159 are smaller than a width 161 of the emitter portions 152. This configuration of the conductive contact 142 allows charge injection of the emitter 144 along a single axis, and polarizes the light signal emitted from the light source 16 to have mostly or all P-polarization.

As described above, the transmission optical structure 18 and the light source 16 are configured to minimize S-polarized light (e.g., the S-polarized light 50) and maximize P-polarized light (e.g., the P-polarized light 52) within the sensor 10. As a result, the light signal 38, the light signal 40, and the light signal 42 is minimized or non-existent in the sensor 10. In another embodiment, either the transmission optical structure 18 or the light source 16 is configured to minimize S-polarized light and maximize P-polarized light within the sensor 10. For example, if the transmission optical structure 18 is configured to polarize light and the light source 16 is not configured to polarize light, the light source 16 may emit unpolarized light. As another example, if the transmission optical structure 18 is not configured to polarize light and the light source 16 is configured to polarize light, the transmission optical structure 18 may not include a polarizing layer.

The various embodiment disclosed herein provide a sensor that determines a distance between the sensor and a target object external to the sensor. The sensor includes a transmission optical structure and/or a light source that are configured to minimize S-polarized light and maximize P-polarized light within the sensor. As a result, cross talk within the sensor is reduced or removed, and detection results of the sensor are improved.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A device, comprising:
a substrate;
a light source on the substrate, the light source configured to emit a light signal;
a first optical structure aligned with the light source, the first optical structure configured to polarize the light signal from S-polarized light to P-polarized light; and
a detector on the substrate, the detector configured to receive the light signal reflected from an object, the P-polarized light having components extending in a direction parallel to a plane including the light source and the detector, the S-polarized light having components extending in a direction transverse to the plane, wherein the first optical structure includes another substrate, a functional layer that has an optical function, and a polarizing layer that is configured to polarize the light signal, wherein the functional layer and the polarizing layer are on opposite sides of the another substrate.

2. The device of claim 1 wherein the light signal emitted from the light source is P-polarized light.

3. The device of claim 1, further comprising:
a second optical structure aligned with the detector; and
a cover overlying the first optical structure and the second optical structure.

4. The device of claim 3, further comprising:
a body including a first aperture aligned with the light source, and a second aperture aligned with the detector, the first optical structure positioned between the first aperture and the light source, the second optical structure positioned between the second aperture and the detector.

5. The device of claim 1 wherein the light source includes:
an emitter; and
a conductive contact positioned on a first side of the emitter and not positioned on a second side of the emitter, the conductive contact configured to receive an electrical signal from a driver circuit, the emitter configured to emit light in response to the conductive contact receiving the electrical signal.

6. The device of claim 5 wherein the emitter has a shape that is asymmetrical about at least one axis.

7. The device of claim 1 wherein the optical function is a beam shaping function, an imaging function, a collimating function, a diffusing function, a polarizing function, a beam splitting function, a wavefront coding function, or a combination thereof.

8. A device, comprising:
a substrate;
a light source on the substrate, the light source configured to emit a light signal, the light signal being P-polarized light;
a first optical structure aligned with the light source; and
a detector on the substrate, the detector configured to receive the light signal reflected from an object, the P-polarized light having components extending in a direction parallel to a plane including the light source and the detector, wherein the first optical structure includes another substrate, a functional layer that has an optical function, and a polarizing layer that is configured to polarize the light signal from S-polarized light to P-polarized light, wherein the functional layer and the polarizing layer are on opposite sides of the another substrate.

9. The device of claim 8 wherein the light source includes:
an emitter having an asymmetrical shape; and
a conductive contact partially surrounding the emitter.

10. A device, comprising:
a first substrate;
a light source on the first substrate, the light source including:
a plurality of emitters including a first column of emitters and a second column of emitters; and
a conductive contact including a first portion and a second portion that partially surrounds the plurality of emitters, the second portion of the conductive contact extends between the first column of emitters and the second column of emitters;
an optical structure overlying the light source, the light source configured to transmit a P-polarized light signal through the optical structure; and
a detector on the first substrate, the detector configured to receive the P-polarized light signal transmitted through the optical structure and reflected back from an object.

11. The device of claim 10 wherein the light source includes:
a second substrate on the first substrate;
a first mirror on the second substrate;
an active layer on the first mirror;
a second mirror on the active layer;
the plurality of emitters on the second mirror, each of the plurality of emitters having an asymmetrical shape along at least one axis; and
the conductive contact on the second mirror.

12. The device of claim 11 wherein the active layer includes a quantum well.

13. A device, comprising:
a substrate;
a light source coupled to the substrate, the light source configured to transmit a polarized light signal, the polarized light signal being P-polarized light;
an optical structure coupled to the substrate, the optical structure including a polarized layer configured to polarize the polarized light signal, the optical structure configured to polarize light from S-polarized light to P-polarized light; and
a detector coupled to the substrate, the detector configured to receive the polarized light signal transmitted through the optical structure and reflected back from an object, the P-polarized light having components extending in a direction parallel to a plane including the light source and the detector, the S-polarized light having components extending in a direction transverse to the plane, wherein the first optical structure includes another substrate, a functional layer that has an optical function, and a polarizing layer that is configured to polarize the light signal, wherein the functional layer and the polarizing layer are on opposite sides of the another substrate.

14. The device of claim 1 wherein the light source includes:
another substrate on the substrate;
a first mirror on the another substrate;
an active layer on the first mirror;
a second mirror on the active layer;
at least one emitter on the second mirror, the at least one emitter having an asymmetrical shape along at least one axis; and a conductive contact on the second mirror, the conductive contact partially surrounding the at least one emitter.

15. A device, comprising:
a first substrate;
a light source on the first substrate, the light source including:
   at least one emitter; and
   a conductive contact including a first portion and a second portion that partially surrounds the at least one emitter, the first portion and the second portion of the conductive contact positioned on a same side of the at least one emitter;
an optical structure overlying the light source, the light source configured to transmit a P- polarized light signal through the optical structure; and
a detector on the first substrate, the detector configured to receive the P-polarized light signal transmitted through the optical structure and reflected back from an object.

16. The device of claim 15 wherein the light source includes:
a second substrate on the first substrate;
a first mirror on the second substrate;
an active layer on the first mirror;
a second mirror on the active layer;
the at least one emitter on the second mirror, the at least one emitter having an asymmetrical shape along at least one axis; and
the conductive contact on the second mirror.

17. A device, comprising:
a first substrate;
a light source on the first substrate, the light source including:
   at least one emitter; and
   a conductive contact including a first portion and a second portion that partially surrounds the at least one emitter, the first portion extends in a first direction and a second direction transverse to the first direction;
an optical structure overlying the light source, the light source configured to transmit a P-polarized light signal through the optical structure; and
a detector on the first substrate, the detector configured to receive the P-polarized light signal transmitted through the optical structure and reflected back from an object.

18. The device of claim 17 wherein the light source includes:
a second substrate on the first substrate;
a first mirror on the second substrate;
an active layer on the first mirror;
a second mirror on the active layer;
the at least one emitter on the second mirror, the at least one emitter having an asymmetrical shape along at least one axis; and
the conductive contact on the second mirror.

19. A device, comprising:
a first substrate;
a light source on the first substrate, the light source configured to emit a light signal, the light source including:
   a second substrate on the first substrate;
   a first mirror on the second substrate;
   an active layer on the first mirror;
   a second mirror on the active layer;
   at least one emitter on the second mirror, the at least one emitter having an asymmetrical shape along at least one axis; and
   a conductive contact on the second mirror, the conductive contact partially surrounding the at least one emitter;
a first optical structure aligned with the light source, the first optical structure configured to polarize the light signal; and
a detector on the first substrate, the detector configured to receive the light signal reflected from an object.

20. The device of claim 19 wherein the first optical structure is configured to polarize the light signal from S-polarized light to P-polarized light, the P-polarized light has components extending in a direction parallel to a plane including the light source and the detector, and the S-polarized light has components extending in a direction transverse to the plane.

* * * * *